(12) United States Patent
Jiang et al.

(10) Patent No.: US 12,510,344 B2
(45) Date of Patent: Dec. 30, 2025

(54) ROLLING MEASURING INSTRUMENT

(71) Applicant: Wenzhou Weidu Electronics Co., Ltd., Wenzhou (CN)

(72) Inventors: Yixin Jiang, Wenzhou (CN); Jianke Chen, Wenzhou (CN)

(73) Assignee: Wenzhou Weidu Electronics Co., Ltd., Wenzhou (CN)

( * ) Notice: Subject to any disclaimer, the term of this patent is extended or adjusted under 35 U.S.C. 154(b) by 378 days.

(21) Appl. No.: 18/465,504

(22) Filed: Sep. 12, 2023

(65) Prior Publication Data

US 2025/0067548 A1  Feb. 27, 2025

(30) Foreign Application Priority Data

Aug. 23, 2023  (CN) .......................... 202311065955.0

(51) Int. Cl.
*G01B 3/12* (2006.01)

(52) U.S. Cl.
CPC ..................... *G01B 3/12* (2013.01)

(58) Field of Classification Search
CPC ....................................................... G01B 3/12
USPC .................................................... 33/772–782
See application file for complete search history.

(56) References Cited

U.S. PATENT DOCUMENTS

| | | | | |
|---|---|---|---|---|
| 1,433,640 A * | 10/1922 | Morneau | .................. | G01B 3/12 235/91 R |
| 4,176,458 A * | 12/1979 | Dunn | ...................... | G01B 3/12 33/781 |
| 5,052,687 A * | 10/1991 | Katerba | ................ | G01C 22/004 473/150 |
| 5,755,918 A * | 5/1998 | Cetnar | ....................... | B65C 9/46 33/711 |
| 5,943,785 A * | 8/1999 | Kondo | ............... | G01D 5/34723 33/780 |
| 6,550,151 B2 * | 4/2003 | Airey | ....................... | G01B 5/26 33/343 |
| 6,889,444 B2 * | 5/2005 | Trout | ....................... | G01B 3/12 33/780 |
| 6,941,672 B2 * | 9/2005 | Scarborough | ........ | G01B 3/1084 7/163 |
| 7,111,412 B2 * | 9/2006 | Huang | ..................... | G01B 3/12 33/772 |
| 7,131,216 B2 * | 11/2006 | Nepil | ....................... | G01B 3/12 33/772 |
| 7,536,805 B1 * | 5/2009 | Tang | ........................ | G01B 3/12 33/772 |
| 8,196,309 B2 * | 6/2012 | Alkhalifah | ............... | G01B 3/12 33/772 |

(Continued)

*Primary Examiner* — George B Bennett
(74) *Attorney, Agent, or Firm* — Westbridge IP LLC

(57) ABSTRACT

A rolling measuring instrument includes a main body of the measuring instrument, which further comprises a housing, a display screen, a clamping component, and a roller arm. The housing includes a cover plate and a bottom shell that are mutually compatible. One side of the bottom shell is equipped with a pivot seat. The display screen engages with the pivot seat and can be flipped relative to the housing. One end of the roller arm is rotatably connected to the bottom shell, and the other end is rotatably connected to a measuring wheel. The housing is connected to a connecting member through a pin shaft, and the clamping component is assembled to the connecting member. The overall structure is optimized and the use is more convenient.

8 Claims, 8 Drawing Sheets

(56) References Cited

U.S. PATENT DOCUMENTS

| | | | | |
|---|---|---|---|---|
| 8,310,227 B2* | 11/2012 | Lai | ............... | G01B 3/12 33/780 |
| 8,479,407 B2* | 7/2013 | Nepil | ............... | G01B 3/12 33/772 |
| 11,465,310 B2* | 10/2022 | Reed | ............... | B26D 7/28 |
| 2025/0305807 A1* | 10/2025 | Lai | ............... | G01B 3/12 |

* cited by examiner

ROLLING MEASURING INSTRUMENT

CROSS-REFERENCE TO RELATED APPLICATIONS

This application claims priority to Chinese Patent Application No. 202311065955.0, filed on Aug. 23, 2023, the content of which is incorporated herein by reference in its entirety.

TECHNICAL FIELD

The present application relates to the field of measuring instruments, specifically to a rolling measuring instrument.

BACKGROUND

As the name suggests, a rolling measuring instrument obtains data from an object by placing a roller arm on the object to be measured and moving the measuring instrument, with the measuring wheel on the roller arm rolling on the object.

Traditional rolling measuring instruments have certain structural defects and are not convenient to use.

SUMMARY

The purpose of the present application is to provide a rolling measuring instrument to solve the problems of structural defects and inconvenience in use mentioned in the background art.

To achieve the above purpose, the present application provides the following technical solution: a rolling measuring instrument comprising a main body of the measuring instrument. The main body further comprises a housing, a display screen, a clamping component, and a roller arm. The housing comprises a cover plate and a bottom shell that are interlocked with each other. The bottom shell is equipped with a pivot seat on one side. The display screen engages with the pivot seat and can be flipped relative to the housing. One end of the roller arm is rotatably connected to the bottom shell, and the other end of the roller arm is rotatably connected to a measuring wheel. A connecting member is connected to the housing through a pin shaft. The clamping component is assembled on the connecting member.

Preferably, the bottom shell further includes a clamp plate facing the clamping component, and a fixed member is integrally formed on the clamp plate. The clamp plate has multiple evenly spaced slots.

Preferably, the bottom shell is also provided with an installation area, which is an embedded structure. One side of the installation area is provided with a cavity for assembling the pivot seat, and the lower end of the installation area is formed with an installation pillar for assembling the roller arm.

Preferably, the side wall of the display screen facing the housing has two through holes, and a stopper is fixedly assembled inside the display screen by screws. One end of the stopper has meshing teeth that engage with a portion of the through hole of the display screen and the pivot seat.

Preferably, one end of the roller arm has a circular hole and is fitted on the outside of the installation pillar. The roller arm is assembled on the installation pillar by screws. The other end of the roller arm is rotatably assembled with a measuring wheel, and a capacitive sensor is installed inside the measuring wheel to collect rolling data of the measuring wheel. The roller arm also contains a magnet two.

Preferably, the clamping component includes a pressing plate and a linkage plate. The pressing plate is connected to the connecting member and the linkage plate through pin shafts. The linkage plate is also connected to the fixed member through a pin shaft. The linkage plate has mounting holes, and a clamping pillar is installed inside the mounting holes.

Preferably, the linkage plate is also provided with a spare hole, which are located in the middle of the clamping pillar. The clamping pillar includes a bolt portion fixed in the mounting hole and a clamping head portion facing the clamp plate.

Preferably, a magnet one that attracts the magnet two is installed inside the cover plate.

Compared with the prior art, the advantageous effects of the present application are as follows: by measuring the object using the roller arm and restraining the roller arm with the cooperation of magnets, it is placed in the housing to prevent it from falling out frequently and affecting the product's lifespan. The display screen can be rotated relative to the housing for easy observation of data by the operator through the cooperation of the pivot seat and the stopper. At the same time, the pivot seat and the stopper have meshing teeth, allowing the display screen to be flipped at 0°, 30°, 60°, and 90° angles, providing stronger adaptability. The setting of the clamping component facilitates the fixation of the rolling measuring instrument, making it more convenient to use. The overall structure is optimized for greater convenience.

DETAILED DESCRIPTION OF THE EMBODIMENTS

The following will describe the technical solutions in the embodiments of the present application clearly and completely, in conjunction with the accompanying drawings of the embodiments of the present application. The described embodiments are only a part of the embodiments of the present application, not all of them. Based on the embodiments of the present application, all other embodiments obtained by those skilled in the art without creative work are within the scope of protection of the present application.

Figure 1:
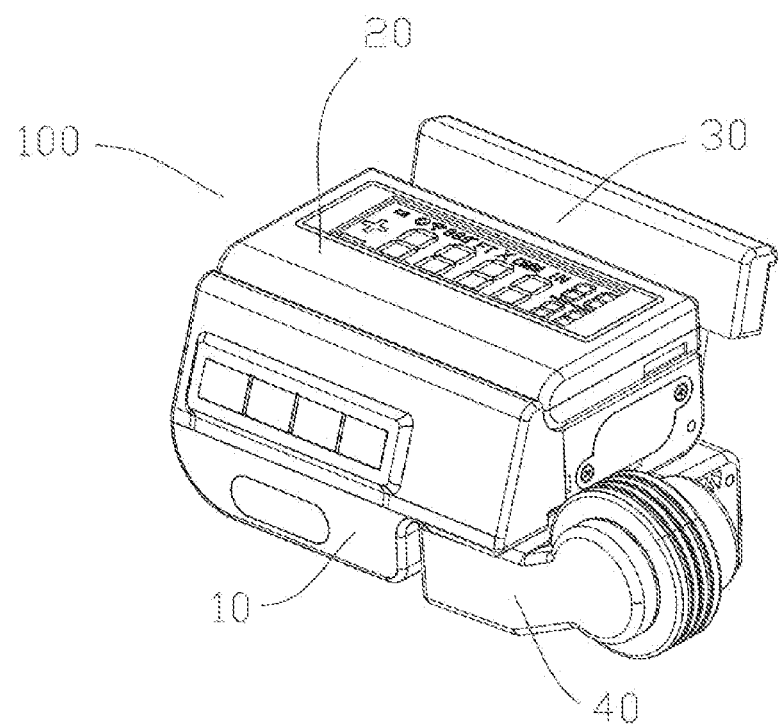
FIG. 1 is a schematic diagram of the overall structure of the present application.
Figure 2:
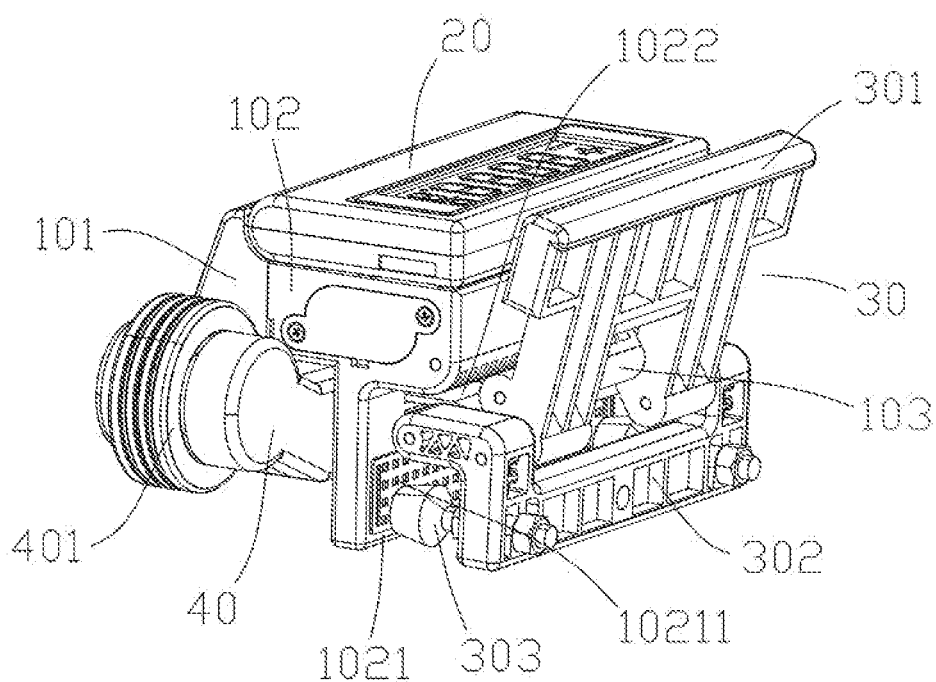
FIG. 2 is a schematic diagram of the overall structure of the present application.
Figure 3:
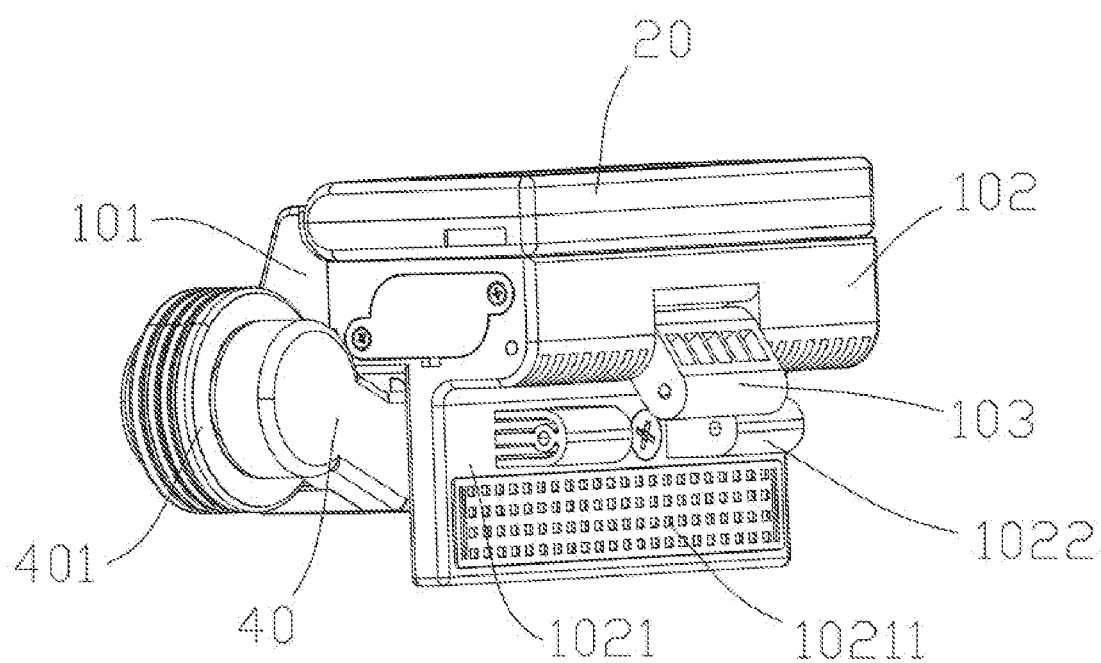
FIG. 3 is a schematic diagram of the overall structure of the present application (without showing the clamping component).
Figure 4:
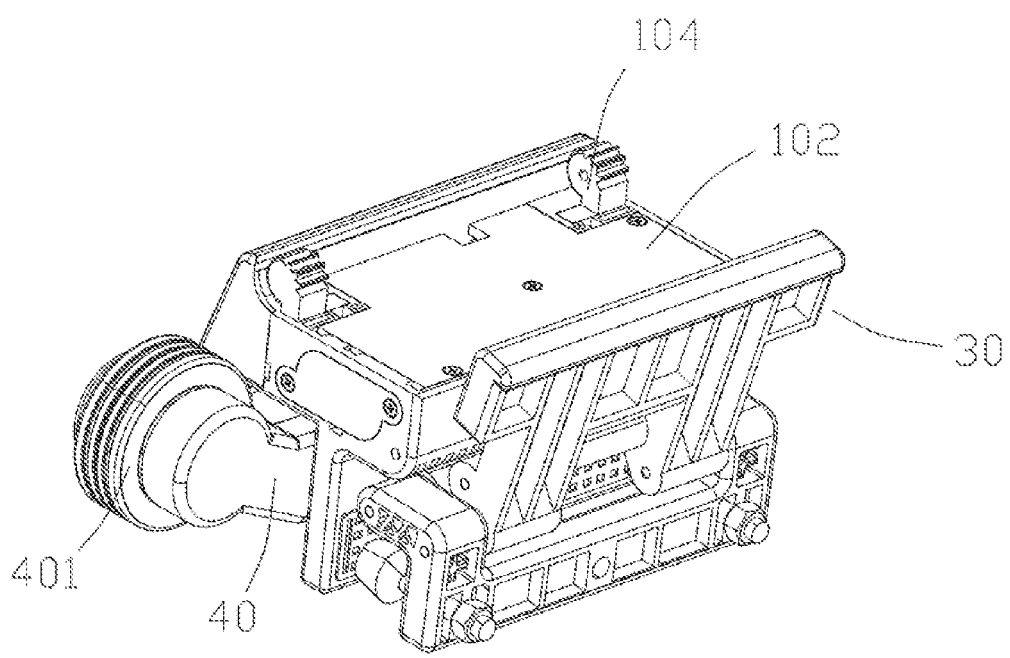
FIG. 4 is a schematic diagram of the overall structure of the present application (without showing the display screen).
Figure 5:
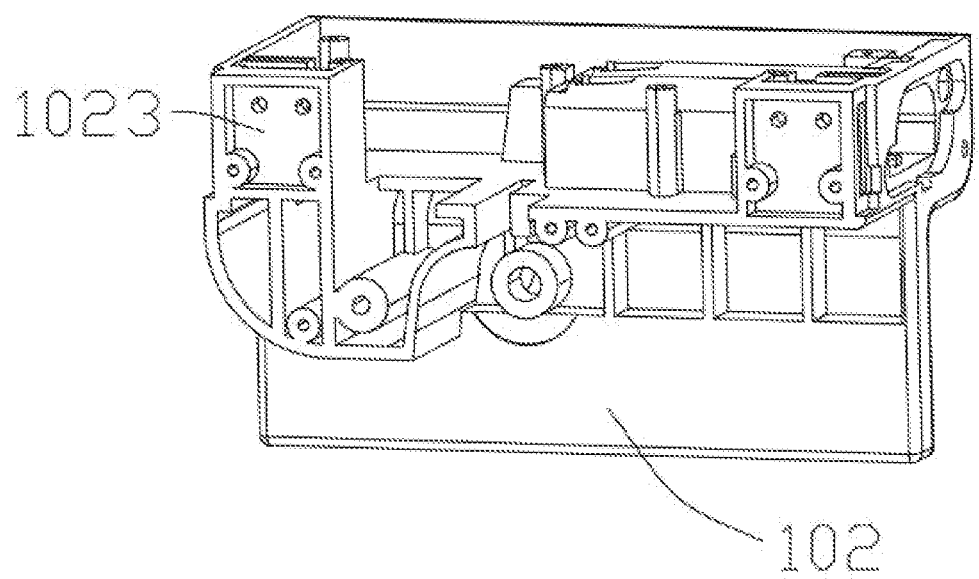
FIG. 5 is a schematic diagram of the bottom shell structure of the present application.
Figure 6:
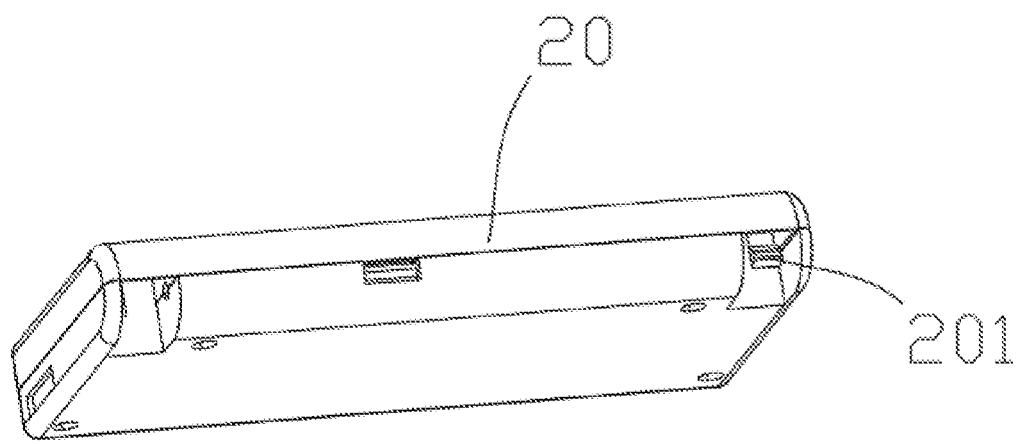
FIG. 6 is a schematic diagram of the display screen structure of the present application.
Figure 7:
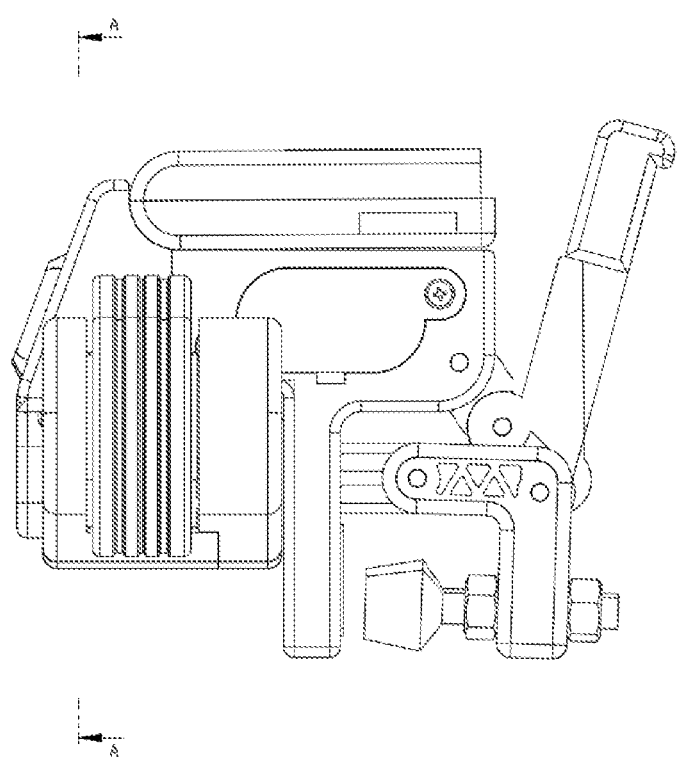
FIG. 7 is a side-view structural schematic diagram of the present application.
Figure 8:
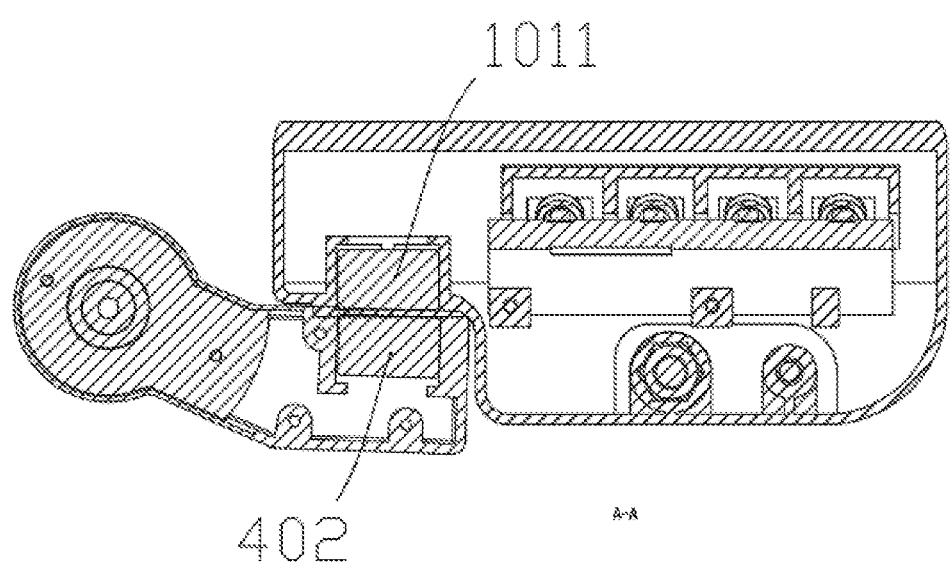
FIG. 8 is a sectional view taken along line A-A of FIG. 7.

Please refer to FIGS. 1-8, a rolling measuring instrument is provided, comprising a main body 100 of the measuring instrument. The main body 100 further includes a housing 10, a display screen 20, a clamping component 30, and a roller arm 40. The housing 10 comprises a cover plate 101 and a bottom shell 102 that are mutually matched and connected. The bottom shell 102 is assembled with a pivot seat 104 on one side. The display screen 20 engages with the pivot seat 104 and can rotate relative to the housing 10. One end of the roller arm 40 is rotatably connected to the bottom shell 102, and the other end is rotatably connected to a measuring wheel 401. The housing 10 is connected to a connecting member 103 through a pin shaft, and the clamping component 30 is assembled on the connecting member 103. The object is measured by the roller arm 40, and the roller arm is secured and placed in the housing 10 to prevent it from frequently falling out and affecting the product's lifespan by the cooperation of magnets. The display screen 20 can rotate relative to the housing 10 for easy observation of data by the operator, achieved through the cooperation of the pivot seat 104 and the stopper 201. The pivot seat 104 and the stopper 201 are equipped with meshing teeth, enabling the display screen to rotate at angles of 0°, 30°, 60°, and 90°, providing greater adaptability. The setting of the clamping component 30 facilitates the fixation of the rolling measuring instrument, making it convenient to use. The overall structure is optimized for greater convenience.

In this embodiment, the bottom shell 102 further includes a clamping plate 1021 facing the clamping component 30, and the clamping plate 1021 integrally forms a fixing member 1022. The clamping plate 1021 is uniformly provided with multiple slot holes 10211. By uniformly arranging the slot holes 10211, the friction force of the clamping part is increased, effectively enhancing the clamping force and preventing the rolling measuring instrument from falling off.

In this embodiment, the bottom shell 102 is also provided with an installation area 1023, which is an embedded structure. One side of the installation area 1023 is equipped with a cavity for assembling the pivot seat 104. The lower end of the installation area 1023 is formed with an installation pillar for assembling the roller arm 40. The pivot seat 104 is inserted into the cavity of the installation area 1023 and fixed to the installation area 1023 with screws.

In this embodiment, the display screen 20 has two through-holes on the side facing the housing 10. The display screen 20 is fixed with a stopper 201 by screws. One end of the stopper 201 is equipped with meshing teeth, which engage with the through-hole of the display screen 20 and the pivot seat 104. The setting of the meshing teeth allows the stopper 201 and the pivot seat 104 to be fixed at angles of 0°, 30°, 60°, and 90°, facilitating the observation by the operator.

In this embodiment, one end of the roller arm 40 is equipped with a circular hole and is fitted on the outside of the installation pillar. The roller arm 40 is assembled to the installation pillar with screws. The other end of the roller arm 40 is rotatably assembled with a measuring wheel 401, which is equipped with a capacitive sensor to collect the rolling data of the measuring wheel 401. The roller arm 40 also has a magnet two 402. The roller arm 40 is assembled to the installation pillar and fixed with screws, allowing it to rotate relative to the installation pillar. The measuring wheel 401 is mounted at the front end of the roller arm 40, and the capacitive sensor collects and processes the rolling data.

In this embodiment, the clamping component 30 includes a pressing plate 301 and a linkage plate 302. The pressing plate 301 is connected to the connecting member 103 and the linkage plate 302 through pin shafts. The linkage plate 302 is also connected to the fixing piece 1022 through a pin shaft. The linkage plate 302 has mounting holes, in which a clamping pillar 303 is installed. When the pressing plate 301 is pressed down, the linkage plate 302 is pushed outward, increasing the distance between the clamping pillar 303 and the clamping plate 1021. When the pressing plate 301 is released, the linkage plate 302 returns to its initial position, and the clamping pillar 303 fixes the object to be measured to the clamping plate 1021, completing the fixation of the rolling measuring instrument.

In this embodiment, the linkage plate 302 is also equipped with a spare hole, which is located in the middle of the clamping pillar 303. The clamping pillar 303 includes a bolt portion fixed in the installation hole and a clamping head portion facing the clamping plate 1021. By designing the spare hole, the clamping pillar 303 can be adjusted according to the shape of the object, making it more versatile. The clamping head portion of the clamping pillar 303 is made of rubber material, effectively increasing the friction for gripping.

In this embodiment, the cover plate 101 is equipped with a magnet one 1011 that attracts the magnet two 402. By setting the magnet one 1011 and the magnet two 402, when the roller arm 40 is converged to the housing 10, the two magnets generate attractive force, which is equal to the force of the roller arm 40 dropping, thereby completing the convergence of the roller arm 40.

For those skilled in the art, it is obvious that the present application is not limited to the details of the exemplary embodiments described above, and can be implemented in other specific forms without departing from the spirit or essential characteristics of the application. Therefore, from any point of view, the embodiments should be considered as illustrative and non-limiting, and the scope of the application is defined by the appended claims rather than the foregoing description. Thus, all variations falling within the meaning and scope of the equivalent elements of the claims are intended to be included within the scope of the application. No element in the claims should be construed as limiting the rights granted.

What is claimed is:

1. A rolling measuring instrument, comprising a main body of the measuring instrument, wherein the main body of the measuring instrument comprises a housing, a display screen, a clamping component, and a roller arm; the housing comprises a cover plate and a bottom shell that are mutually compatible; one side of the bottom shell is equipped with a pivot seat; the display screen engages with the pivot seat and is designed to be flipped relative to the housing; one end of the roller arm is rotatably connected to the bottom shell, and the other end is rotatably connected to a measuring wheel; the housing is connected to a connecting member through a pin shaft, and the clamping component is assembled to the connecting member.

2. The rolling measuring instrument according to claim 1, wherein the bottom shell comprises a clamping plate facing the clamping component, and a fixed member is integrally formed on the clamping plate; the clamping plate has multiple evenly spaced slot holes.

3. The rolling measuring instrument according to claim 2, wherein the bottom shell further comprises an installation area, which is an embedded structure; one side of the installation area is equipped with a cavity for assembling the pivot seat, and the lower end of the installation area is formed with an installation pillar for assembling the roller arm.

4. The rolling measuring instrument according to claim 1, wherein the side wall of the display screen facing the housing is provided with two through holes; the display screen is fixedly assembled with a stopper by screws; one end of the stopper is provided with meshing teeth, which engage with the through holes of the display screen and the pivot seat.

5. The rolling measuring instrument according to claim 1, wherein one end of the roller arm has a circular hole and is fitted on the outside of the installation pillar; the roller arm is assembled to the installation pillar by screws; the other end of the roller arm is rotatably assembled with a measuring wheel, and a capacitive sensor is installed inside the measuring wheel to collect rolling data of the measuring wheel; the roller arm also contains a magnet two.

6. The rolling measuring instrument according to claim 1, wherein the clamping component comprises a pressing plate and a linkage plate; the pressing plate is connected to the connecting member and the linkage plate through a pin shaft; the linkage plate is also connected to the fixed member through a pin shaft; the linkage plate has a mounting hole, in which a clamping pillar is installed.

7. The rolling measuring instrument according to claim 6, wherein the linkage plate is also equipped with a spare hole, which is located in the middle of the clamping pillar; the clamping pillar comprises a bolt portion fixed in the installation hole and a clamping head portion facing the clamping plate.

8. The rolling measuring instrument according to claim 1, wherein the cover plate is equipped with a magnet one that attracts the magnet two.

\* \* \* \* \*